United States Patent Office 3,362,784
Patented Jan. 9, 1968

3,362,784
PROCESS FOR IMPROVING THE CATALYTIC PROPERTIES OF LEAD TITANATE
Kamran Aykan, Clarksboro, N.J., assignor to E. I. du Pont de Nemours and Company, Wilmington, Del., a corporation of Delaware
No Drawing. Filed Oct. 15, 1963, Ser. No. 316,448
9 Claims. (Cl. 23—51)

The present invention relates to lead titanate catalyst, and more particularly to a method of preparing lead titanate catalysts having improved performance when employed to catalyze the reaction of propylene and nitric oxide to form acrylonitrile.

The synthesis of acrylonitrile by the reaction of propylene and nitric oxide at a temperature of 400° to 700° C. over a silver-on-silica catalyst is described in U.S. Patent 2,736,739. As disclosed therein, this reaction gives acrylonitrile in conversions up to about 12%. More recently, it was discovered in small-scale experiments that lead titanate catalysts are considerably more active than the silver-on-silica catalyst in the aforementioned propylene-nitric oxide reaction. I have now found a way a make the lead titanate catalyst even more useful.

The performance of a catalyst may be judged in various ways, depending on the particular reaction in which the catalyst is used. In general, however, a high-performance catalyst may be considered to be one which possesses, and maintains over a prolonged period, a high degree of selective activity, i.e., one which promotes for a prolonged period of time a conversion of the reactants to the desired product in an amount as close as possible to that theoretically obtainable from the amounts of reactants employed. The relationship between the amount of a desired product obtained and that theoretically obtainable can be described in terms of "conversion" and "yield."

As used herein, the term "conversion" means the ratio of moles of the desired product obtained to moles theoretically obtainable from the moles of a reactant fed to the reactor. "Yield" means the ratio of moles of the desired product obtained to moles theoretically obtainable based on the moles of a reactant consumed in the reaction (i.e., the moles of reactant fed to the reactor less the moles of unreacted reactant recovered).

Thus, in a catalytic process such as the one described above, when all other conditions are equal, higher conversions (i.e., higher consumption of reactant) are obtained with catalysts having higher activity, and higher yields (i.e., less by-product formation) are obtained with catalysts having greater selectivity for the desired reaction. Obviously, high conversions are desirable. In addition, at any conversion level, it is important that the amount of reactant consumed in forming undesired by-products be as low as possible, i.e., that the yield be as high as possible. That is, a satisfactorily active catalyst should offer as high selectivity as possible for the formation of the desired product. In addition, higher-performance catalysts maintain their selective activity over prolonged periods, requiring less-frequent regeneration and replacement than lower-performance catalysts.

Lead titanate ($PbTiO_3$) catalyst of the kind used heretofore are prepared by heating a mixture of lead oxide (PbO) and titanium dioxide within the range of about 350° C. to about 750° C., preferably from about 550° C. to about 650° C., for a period of time which varies depending on the temperature used, two hours' heating usually being satisfactory in the preferred temperature range. Other compounds of lead and titanium can be used as the starting materials instead of the oxides and thus are equivalents for the purposes of this invention. For example, oxygen-containing lead compounds which are converted to lead oxide upon calcination can be used, such as the higher oxides of lead ($Pb_2O_3$, $Pb_3O_4$, and $PbO_2$), lead hydroxide, lead carbonate, lead nitrate, lead subacetate, and others. In addition to the oxides and hydroxides of titanium, the chloride or nitrate can be used, or the organic titanates. Lead titanate catalysts which have been found to have activity in the propylene-nitric oxide reaction can be essentially all lead titanate, or they can additionally contain uncombined lead oxide and/or titanium dioxide. All such compositions can be improved by the present process. For use in unsupported form the catalysts are pelleted or extruded either prior or subsequent to heating. Alternatively, the catalyst can be extended on a support material in accordance with conventional techniques.

I have now found that lead titanate catalysts having improved performance when employed to catalyze the reaction of propylene and nitric oxide to form acrylonitrile are obtained by taking the product resulting from the reaction of lead oxide with titanium dioxide by heating at a temperature of at least about 350° C. for a time at least sufficient for lead titanate to form, and subjecting that product to the leaching action of an acidic liquid selected from the group consisting of aliphatic carboxylic acid, an aqueous solution of said acid in concentration of at least about 2% by weight, and an aqueous solution of nitric acid in concentration in the range of about 1% to about 15% by weight, and separating said acidic liquid from said product.

A lead titanate catalyst, after treatment in the aforesaid manner, gives considerably higher average cumulative yield of acrylonitrile from propylene and nitric oxide than does the same catalyst without such treatment. By "average cumulative yield" is meant the average yield obtained over a certain number of evaluation hours.

The mechanism by which the process of the invention effects an improvement in lead titanate catalysts is not understood, but it is known that the improvement results from the treatment with the acidic liquid in such a way that a leaching action occurs. It will be seen from the analytical data given in the examples that the removal of lead is involved. However, why this loss of lead, and any other phenomena which may be involved, should impart such long-lasting selectivity to the catalyst is not known.

The aliphatic carboxylic acid used in practicing the process of the invention can be varied widely. Preferred, of course, are those that are soluble in, or miscible with, water or are liquid or liquefiable at relatively low temperatures. Illustrative are the various fatty acids, substituted carboxylic acids, especially the halogenated acids, e.g., chloroacetic acid and trifluoroacetic acid, and polycarboxylic acids, e.g. oxalic acid and malonic acid. While the number of carbon atoms in the carboxylic acid has no critical effect on the results produced in the catalyst, for reasons of economy and availability, preferred are the lower alkanoic acids, i.e., those having one to four carbon atoms in the molecule, viz, formic, acetic, propionic, and butyric acids.

The carboxylic acid, or mixtures thereof, can be employed alone, if liquid, or in aqueous solution. The concentration of the carboxylic acid solution appears to cause no significant difference in results on the catalyst. As shown in the Examples, 5% and 30% solutions of acetic acid are equivalent in effect to 10% solutions. Therefore, while higher concentrations up to 100% can be used, they offer no advantage. Generally, the carboxylic acid solution should have a concentration of at least about 2% by weight, and preferably a solution of at least 5% concentration will be employed in order to assure maximum catalyst improvement.

When an aqueous nitric acid solution is used as the catalyst-treating acid, it is well not to use concentrations much above about 10%, e.g., above about 15%, since such solutions exert an excessive dissolving effect on lead titanate and thus result in catalyst loss. However, on the lower end, concentrations as low as 1% nitric acid in water are effective.

The amount of acidic liquid employed in the present process is not critical but should of course be at least sufficient to soak the catalyst so that leaching of materials in the catalyst which are soluble in the acidic liquid can occur. An amount of liquid of about 100 milliliters per 100 grams of catalyst gives satisfactory results. However, it will be understood that any volume of liquid beyond the amount required for soaking and leaching can be employed.

The temperature at which the contacting of the lead titanate catalyst with the aliphatic carboxylic acid or nitric acid solution is carried out has no critical effect on the performance of the treated catalyst, but does control the treatment time required. Room temperature can be used, but elevated temperatures are preferred in order to reduce the time required. Temperatures at or near the boiling point of the acid or acid solution require the shortest treatment times, e.g., about 0.5–1 hour. Lower temperatures generally require about 5 hours or more.

The required leaching action can be effected using any of the conventional leaching techniques. For example, a full-immersion method can be employed, wherein the acidic liquid completely immerses or floods the catalyst for the duration of the treatment. One batch of acidic liquid may remain in the leaching vessel, or a constant or periodic throughflow of liquid, entering either from top or bottom, may be maintained. Alternatively, an intermittent drainage procedure may be used, wherein the catalyst is covered with the liquid and then drained before submerging with more liquid. The submersion followed by drainage can be repeated several times. Still another leaching procedure which can be used is the spray percolation method wherein the liquid is sprayed onto the top of the charge, trickles without flooding through the interstices of the solids, drips through a false bottom in the vessel, and collects for discharge. The liquid may be recirculated for additional passes through the catalyst, or fresh liquid may be used for additional passes. Continuous leaching procedures also may be employed.

Although it is not required that the acid solution be washed out of the catalyst after treatment, washing the solution out with water results in a catalyst on which the rate of carbon deposition is lower than on a catalyst treated in the same manner but unwashed. Therefore, in cases where carbon deposition is an important consideration, washing is preferred. Washing also is preferred when the carboxylic acid is used in 100% strength. More than one wash can be used but generally offer no significant advantage.

The following examples illustrate specific embodiments of the process of the present invention and the effect of this process on the performance of the catalyst prepared thereby, as judged specifically from the results achieved when said catalyst is used in the preparation of acrylonitrile by the vapor-phase reaction of propylene and nitric oxide. The terms "conversion" and "yield" appearing in the examples have the connotation given previously, both being based on moles of nitric oxide as the limiting reactant, the ratios being expressed in terms of percentage for simplicity. The calculation of conversion and yield are based on the following reaction stoichiometry:

$$H_2C=CH-CH_3 + 1.5\ NO \rightarrow H_2C=CH-C\equiv N + 0.25\ N_2 + 1.5\ H_2O$$

The lead titanate catalysts employed as the starting materials in the examples are prepared according to the following procedure:

Equal quantities by weight of powdered lead oxide (PbO) and titanium dioxide (anatase) are mixed intimately. An aqueous solution of polyvinyl alcohol is blended into the mixture so as to form aggregates. The aggregate mixture is dried to a certain moisture content, and then pelleted or extruded in the desired size. The pelleted or extruded material is calcined at about 600° C. for 2 hours.

Examples 1–7

Lead titanate catalysts prepared as described above in the form of pellets or extrudates of different sizes are leached with acetic acid solutions by introducing the particular catalyst into a refluxing solution of aqueous acetic acid, and maintaining the catalyst in contact with the solution for a specified time. About 100 milliliters of solution is employed per 100 grams of catalyst. Thereafter, the catalyst is separated from the solution, washed with water or not as indicated, and dried by heating at 125° C. to achieve a moisture content below 1% by weight.

The effectiveness of the acetic acid treatment is evaluated by comparing the performance of the thus-treated catalyst with that of the untreated catalyst in the vapor-phase reaction of propylene and nitric oxide. In each case, the catalyst is packed into a tubular reactor operating at a temperature ranging from 495° C. to 505° C., and a gaseous mixture of 64% of nitrogen, 9% of nitric oxide, and 27% of propylene (all by volume) is passed at 8 p.s.i.g. pressure through the catalyst bed. The feed rate and the bed volume is such that the contact time falls within the range of from 0.1 to 10 seconds. Table I shows

TABLE I

| Ex. No. | Catalyst Description | Acetic Acid Treatment Conditions | | | Propylene-NO Reaction Conditions | | | Catalyst Performance Relative to That of Same Catalyst Untreated, Employed under Same Reaction Conditions | | | |
|---|---|---|---|---|---|---|---|---|---|---|---|
| | | Acid Concn. (weight percent) | Acid-Catalyst Contact Time (hrs.) | Washing Procedure [1] | Temp. (°C.) | Time Catalyst Used Prior to Performance Test (hrs.) | Time Over Which Performance Evaluated (hrs.) | Av. Cumulative Yield | Av. Cumulative Conv. | Av. ACRN/ACN Mole Ratio | Carbon Deposition |
| 1 | 5/32 in. pellets | 10 | 20 | A | 495 | 348 | 250 | 35% higher | 12% higher | 109% higher | |
| | | 10 | 20 | A | 505 | 599 | 235 | 34% higher | 20% higher | 82% higher | |
| | | 10 | 20 | A | 505 | 1,302 | 100 | 17% higher | 53% higher | 73% higher | 70% less.[2] |
| 2 | ...do... | 10 | 0.5 | A | 495 | 16 | 31 | 19% higher | 5% higher | ...do... | 67% less.[2] |
| 3 | ...do... | 5 | 2 | A | 495 | 0 | 173 | ...do... | ...do... | 40% higher | 81% less.[2] |
| 4 | ...do... | 30 | 2 | A | 495 | 0 | 171 | 18% higher | 3% higher | 50% higher | |
| 5 | ...do... | 10 | 2 | B | 495 | 0 | 180 | 16% higher | 12% higher | 40% higher | |
| 6 | 3/16 in. pellets | 10 | 1 | C | 495 | 0 | 20 | ...do... | 2% higher | 130% higher | 46% less.[3] |
| 7 | 1/8 in. extrudates | 10 | 5 | A | 505 | 161 | 51 | 14% higher | 3% higher | 127% higher | 58% less.[2] |

ACRN=acrylonitrile. ACN=acetonitrile.
[1] A: washed with hot water; B: washed with cold water; C: not washed.
[2] Per hour.
[3] Per 1.5 hours.

the improved results attained with lead titanate catalysts treated with acetic acid as described above under various treatment conditions, and employed in the described reaction under different reaction conditions. In each case, the results are reported on the basis of their relationship to the results attained with the same lead titanate catalyst without acetic acid treatment employed under the same conditions of temperature and contact time as the treated catalyst.

To provide an insight into the chemical effect which the present process has on lead titanate catalysts, 85.24 grams of 5/32-inch lead titanate pellets, prepared as described previously, are leached with a 10% aqueous acetic acid solution for 2 hours. Then, the catalyst is separated from the solution and washed with hot water. The solution and wash water are combined and analyzed gravimetrically for lead. The total lead in solution is 0.3794 gram.

*Examples 8–11*

The catalyst treatment procedure described in the introduction to Examples 1–7 is repeated except that the actic acid solution is replaced by aqueous solutions of different carboxylic acids and of nitric acid. The following table shows the treatment details and the improved results attained with the treated catalysts. In each example shown, the treated catalyst is washed with hot water.

tion. Also, catalyst activity increases with increasing operating temperature. Therefore, if at a particular operating temperature an increase in activity is desired with the more selective treated lead titanate catalyst, higher conversions can be achieved by employing a higher reaction temperature. If one compares, for example, the improvement obtained with the catalyst of Example 1 at 495° C. with that obtained at 505° C., one sees that the improvement in yield is maintained at the higher temperature and that the improvement in conversion is increased considerably.

The foregoing detailed description has been given for clearness of understanding only and no unnecessary limitations are to be understood therefrom. The invention is not limited to the exact details shown and described for various modifications which do not materially change the basic character of the invention or depart from the principle or spirit of the invention will appear to those skilled in the art.

I claim:

1. A process for improving the catalytic properties of a lead titanate catalyst made by reacting lead oxide with titanium dioxide at a temperature of about 350° C. to about 750° C. which comprises leaching said lead titanate catalyst with an acidic liquid selected from the group consisting of aliphatic carboxylic acid, an aqueous solution of said acid in concentration of at least

TABLE II

| Ex. No. | Catalyst Description | Acid Treatment Conditions | | Propylene-NO Reaction Conditions | | Catalyst Performance Relative to That of Same Catalyst Untreated Employed under Same Reaction Conditions | | | | |
|---|---|---|---|---|---|---|---|---|---|---|
| | | Acid Concn. (Weight percent) | Acid-Catalyst Contact Time (hrs.) | Temp. (° C.) | Time Catalyst Used Prior to Performance Test (hrs.) | Time Over Which Performance Evaluated (hrs.) | Av. Cumulative Yield | Av. Cumulative Conv. | Av. ACRN/ACN Mole Ratio | Carbon Deposition |
| 8 | 5/32 in. pellets | 10% HNO$_3$ | 20 | 495 | 0 | 87 | 15% higher | 5% higher | 150% higher | 60% less.[1] |
| 9 | do | 10% Formic Acid | 2 | 495 | 0 | 98 | do | do | 80% higher | 90% less.[2] |
| 10 | do | 10% Propionic Acid. | 20 | 495 | 0 | 29 | 17% higher | do | do | 94% less.[2] |
| 11 | do | 10% Butyric Acid | 2 | 495 | 0 | 45 | 11% higher | 2% lower | 60% higher | 41% less.[2] |

ACRN=acrylonitrile. ACN=acetonitrile.
[1] per 1.5 hours. [2] per hour.

As is seen from the foregoing examples, the process of this invention provides a means of effecting a significant improvement in the long-range performance of lead titanate catalysts in the propylene-nitric oxide reaction. Table I shows that catalysts treated by the present process give significantly higher average cumulative yields, higher ratios of desired product to byproduct, and lower carbon deposition rates over periods of evaluation ranging from 20 to 250 hours than do untreated lead titanate catalysts. The improvement is seen to be attained at the beginning of catalyst used and maintained over long periods of use. Indeed, the superiority of catalysts treated by the present process becomes more pronounced with catalyst age; i.e., conventional lead titanate catalysts give lower yields the longer they are used, whereas the catalysts treated by the present process maintain their selectivity over long periods of use. Thus the catalyst of Example 1, which gives a 34% higher average cumulative yield than the untreated catalyst after about 600 hours of use, gives a 53% higher yield after about 1300 hours of use.

The greater selectivity of lead titanate catalysts treated according to the present process is accompanied by little or no sacrifice in catalyst activity, i.e., in average cumulative conversions, and in most cases the treated catalysts are more active, i.e., give higher conversions. Moreover, it has been found that the treated catalysts have improved selectivity even when used at higher operating temperatures in the propylene-nitric oxide reaction.

about 2% by weight and an aqueous solution of nitric acid in concentration in the range of about 1% to about 15% by weight and separating said acidic liquid from the lead titanate.

2. A process of claim 1, wherein the lead titanate, after having been separated from said acidic liquid, is washed with water, and dried.

3. A process of claim 1, wherein the acid is nitric acid solution of concentration in the range of about 1% to about 10% by weight.

4. A process of claim 1, wherein the leaching is carried out substantially at the boiling temperature of the acidic liquid.

5. A process for improving the catalytic properties of a lead titanate catalyst made by reacting lead oxide with titanium dioxide at a temperature of about 350° C. to about 750° C. which comprises leaching said lead titanate catalyst with an acidic liquid selected from the group consisting of aliphatic carboxylic acid and an aqueous solution of said acid in concentration of at least about 2 percent by weight and separating said acidic liquid from the lead titanate.

6. A process of claim 5 wherein the acid is acetic acid.

7. A process of claim 5 wherein the acid is formic acid.

8. A process of claim 5 wherein the acid is propionic acid.

9. A process of claim 5 wherein the acid is a solution of an aliphatic carboxylic acid in water in a concentration in the range of about 5 percent to about 30 percent.

References Cited

UNITED STATES PATENTS

| | | | |
|---|---|---|---|
| 2,140,236 | 12/1938 | Lederle et al. | 23—51 |
| 3,023,226 | 2/1962 | England et al. | 260—465.3 |
| 3,141,902 | 7/1964 | Huntley et al. | 252—461 X |
| 3,184,415 | 5/1965 | Huntley et al. | 252—461 |

MILTON WEISSMAN, *Primary Examiner.*

OSCAR R. VERTIZ, *Examiner.*

H. T. CARTER, *Assistant Examiner.*